June 24, 1941. M. P. BLOMBERG 2,246,499
CAR CONSTRUCTION
Filed Nov. 14, 1934 12 Sheets-Sheet 1
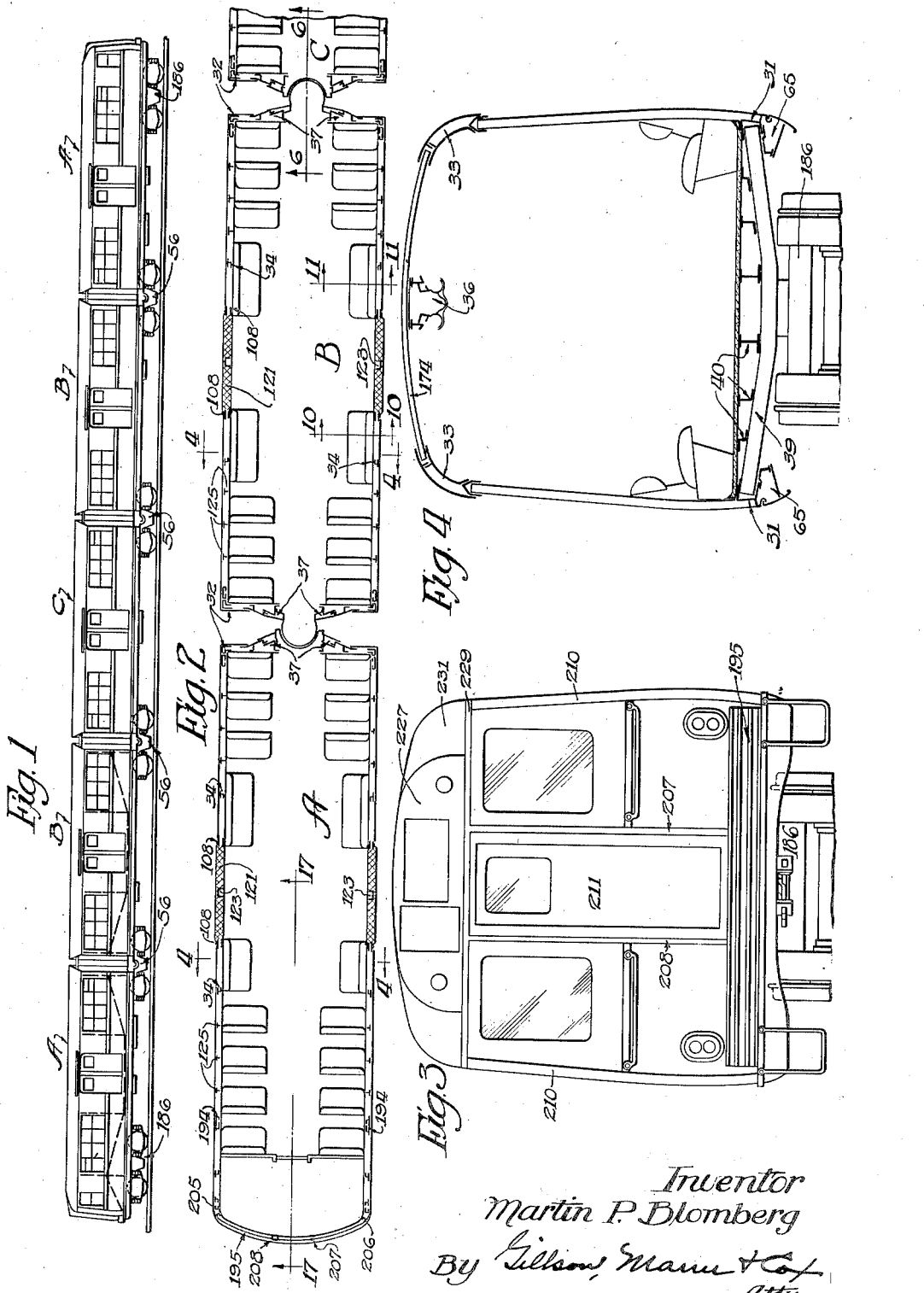

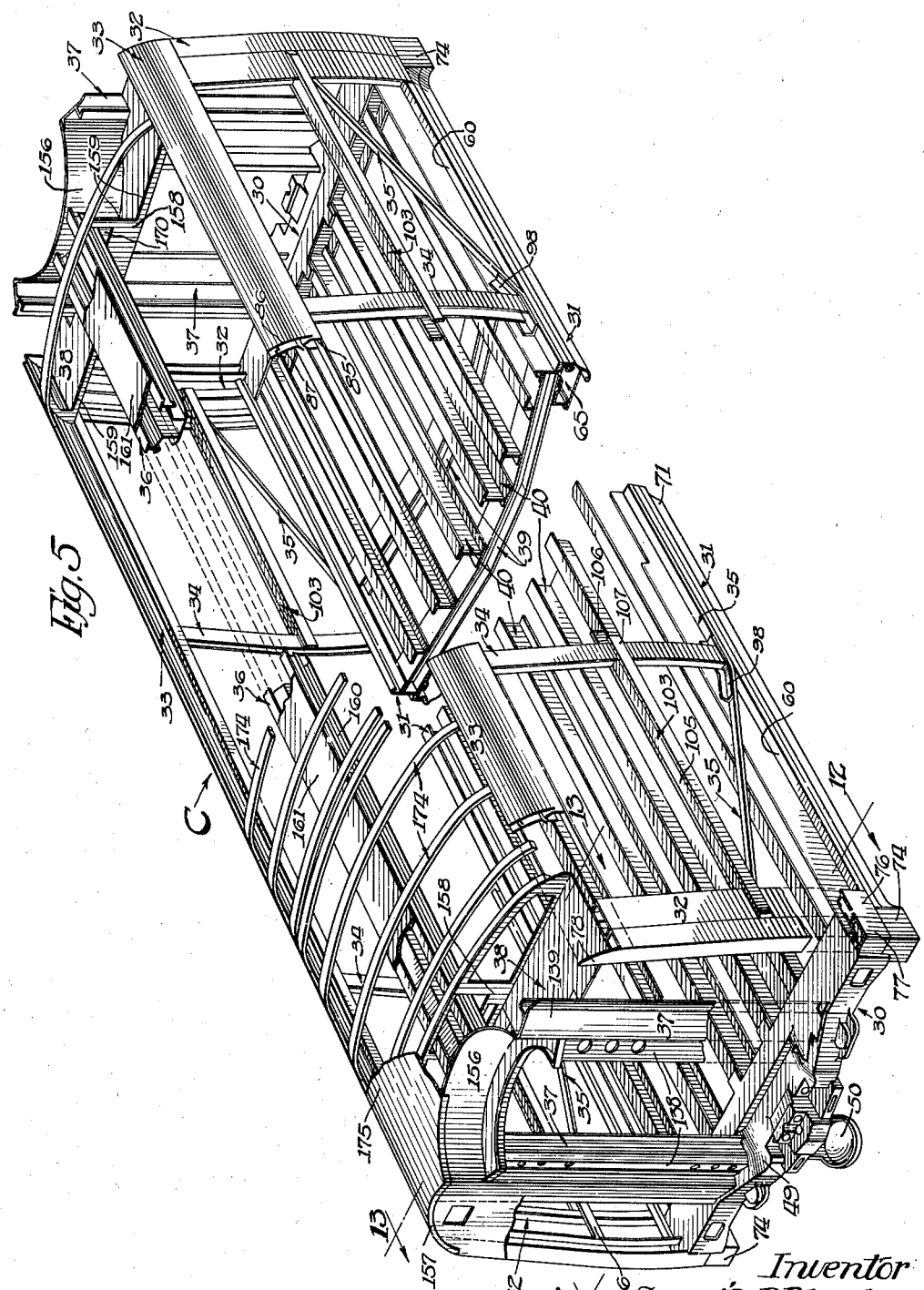

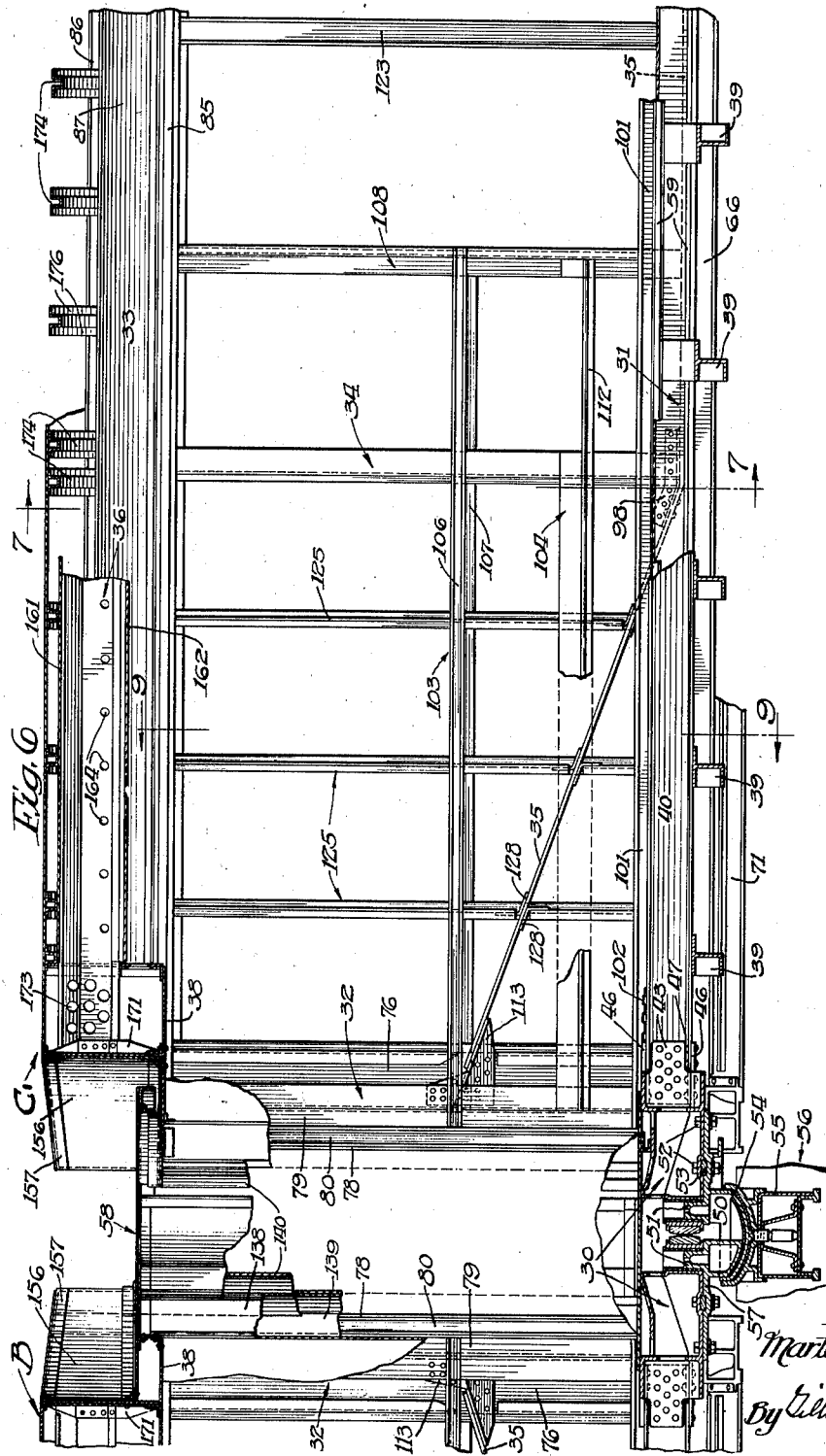

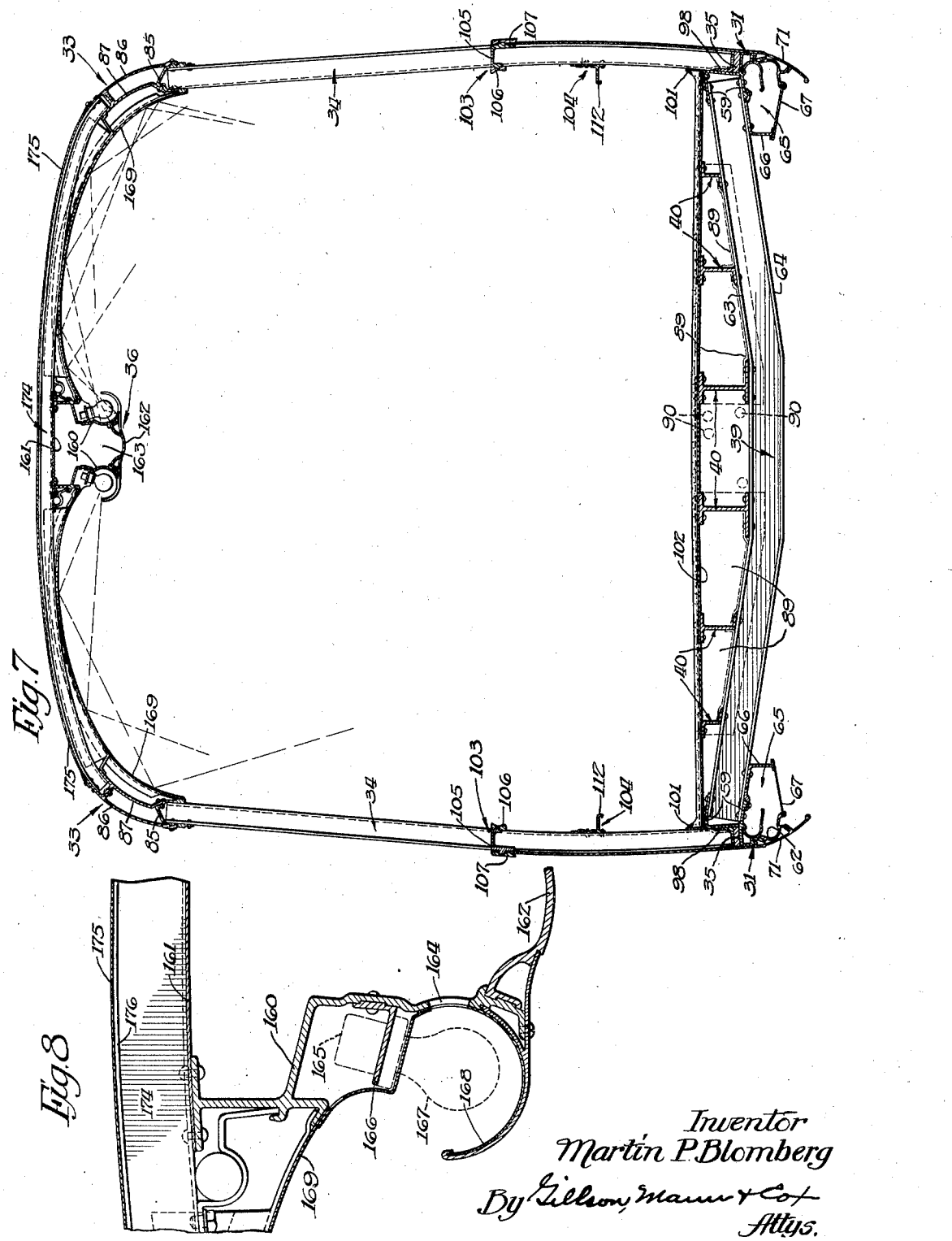

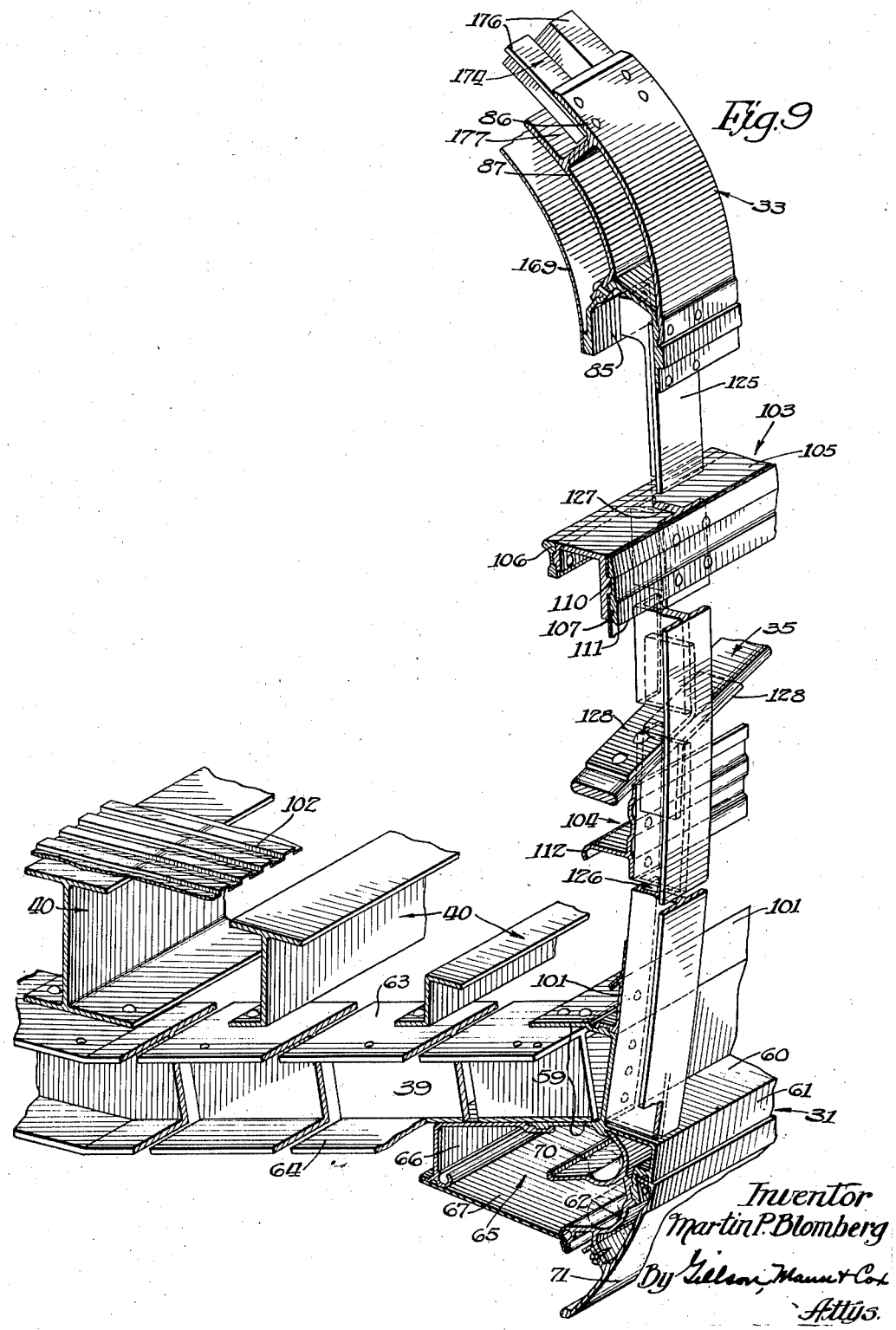

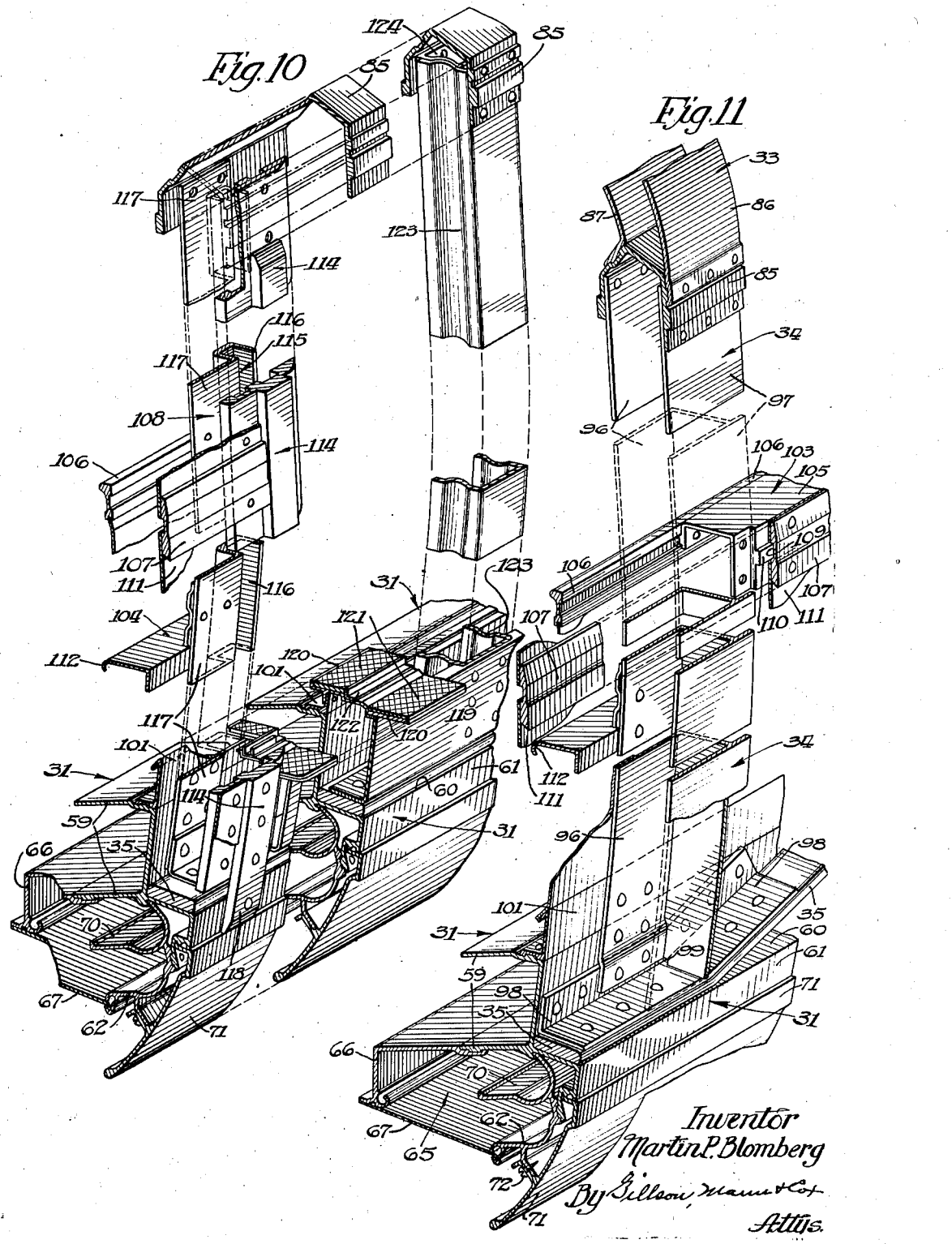

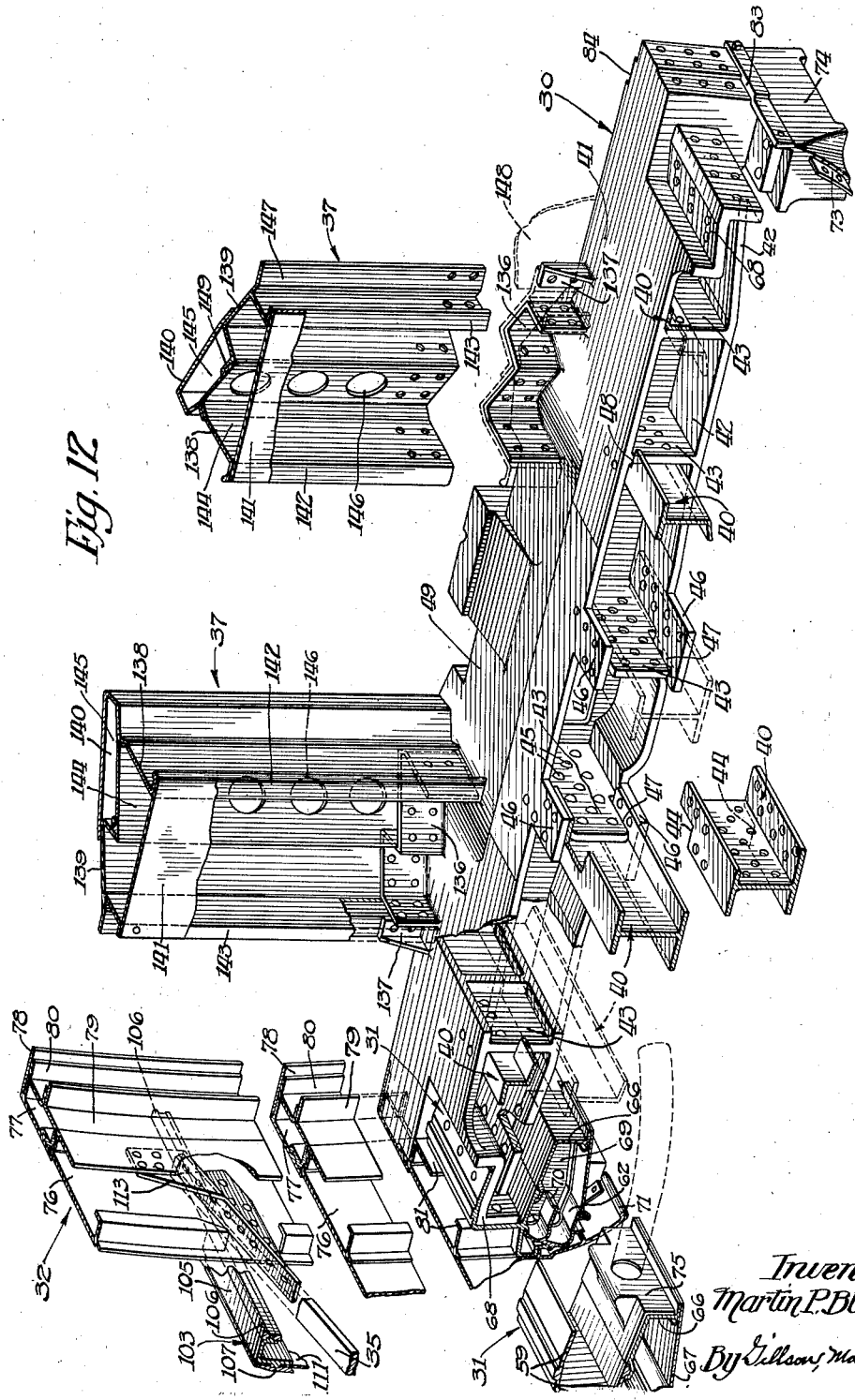

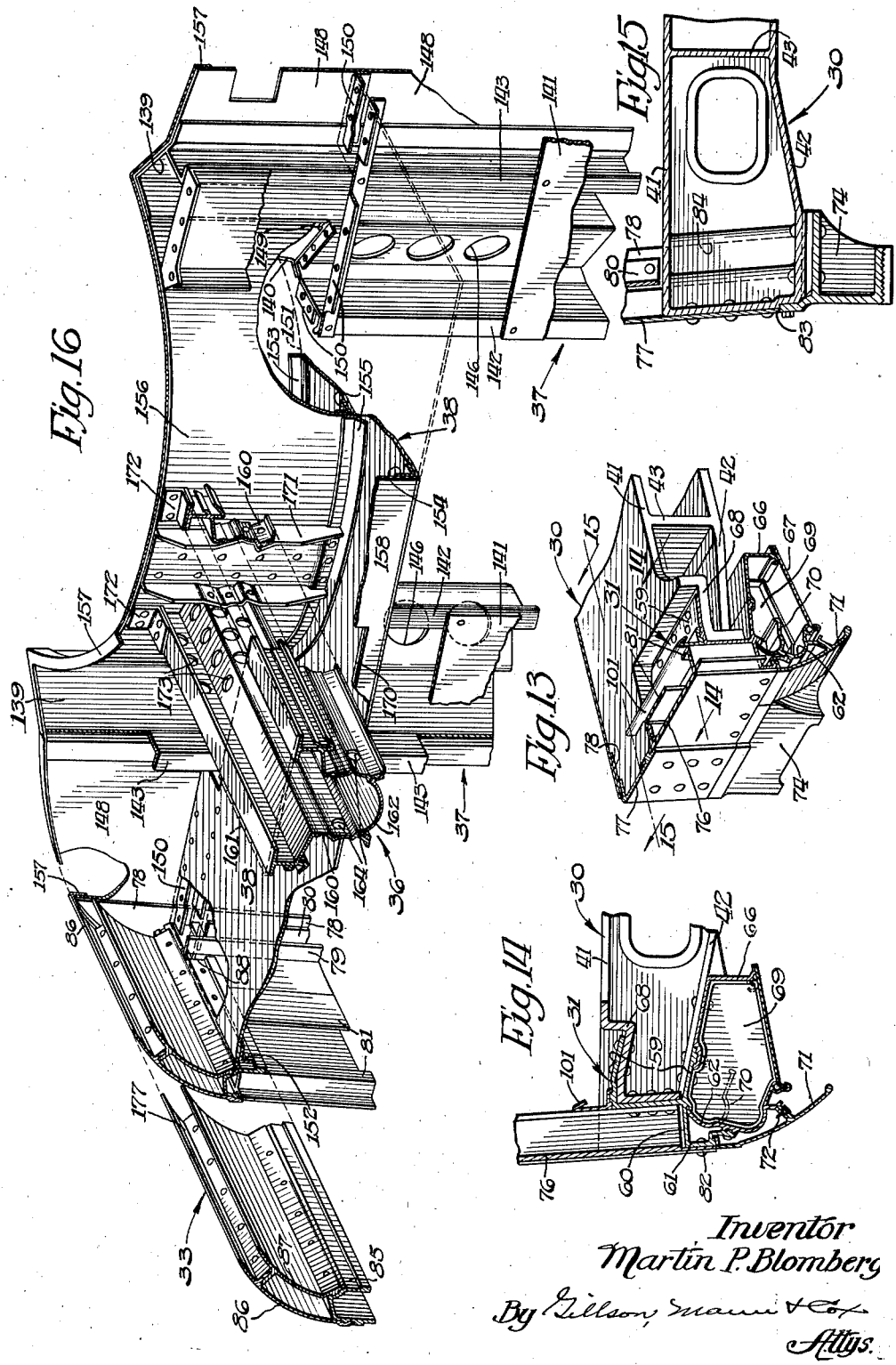

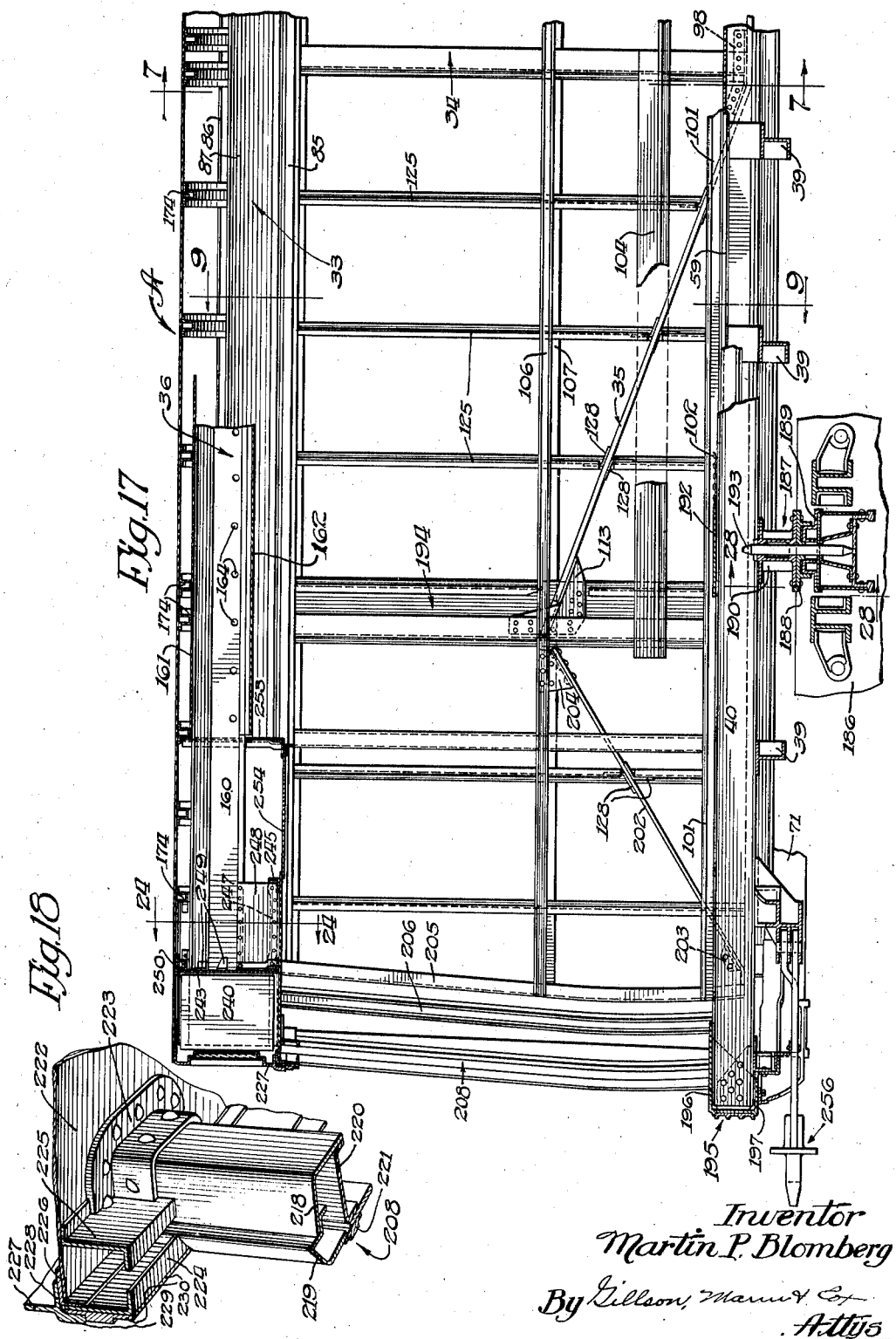

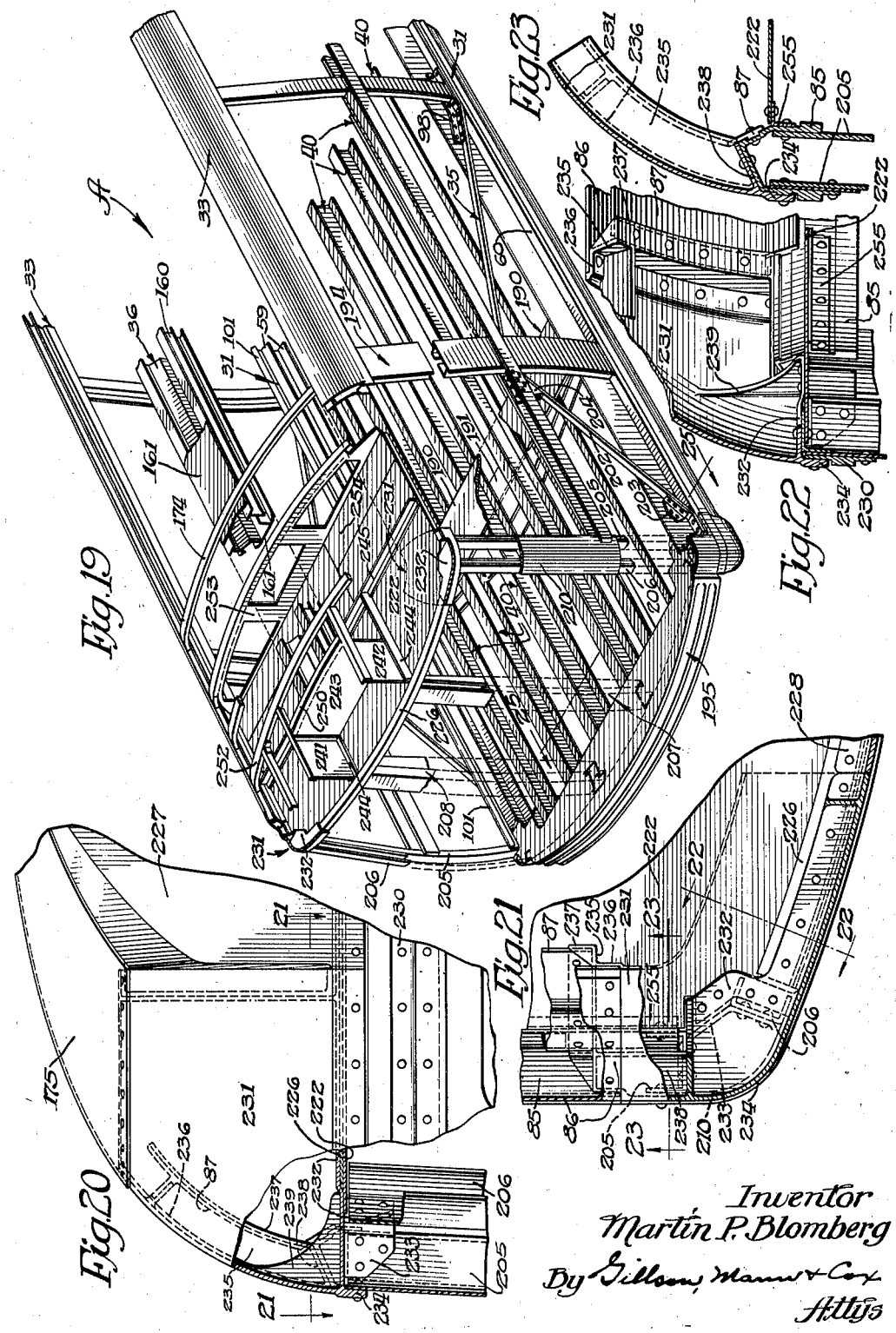

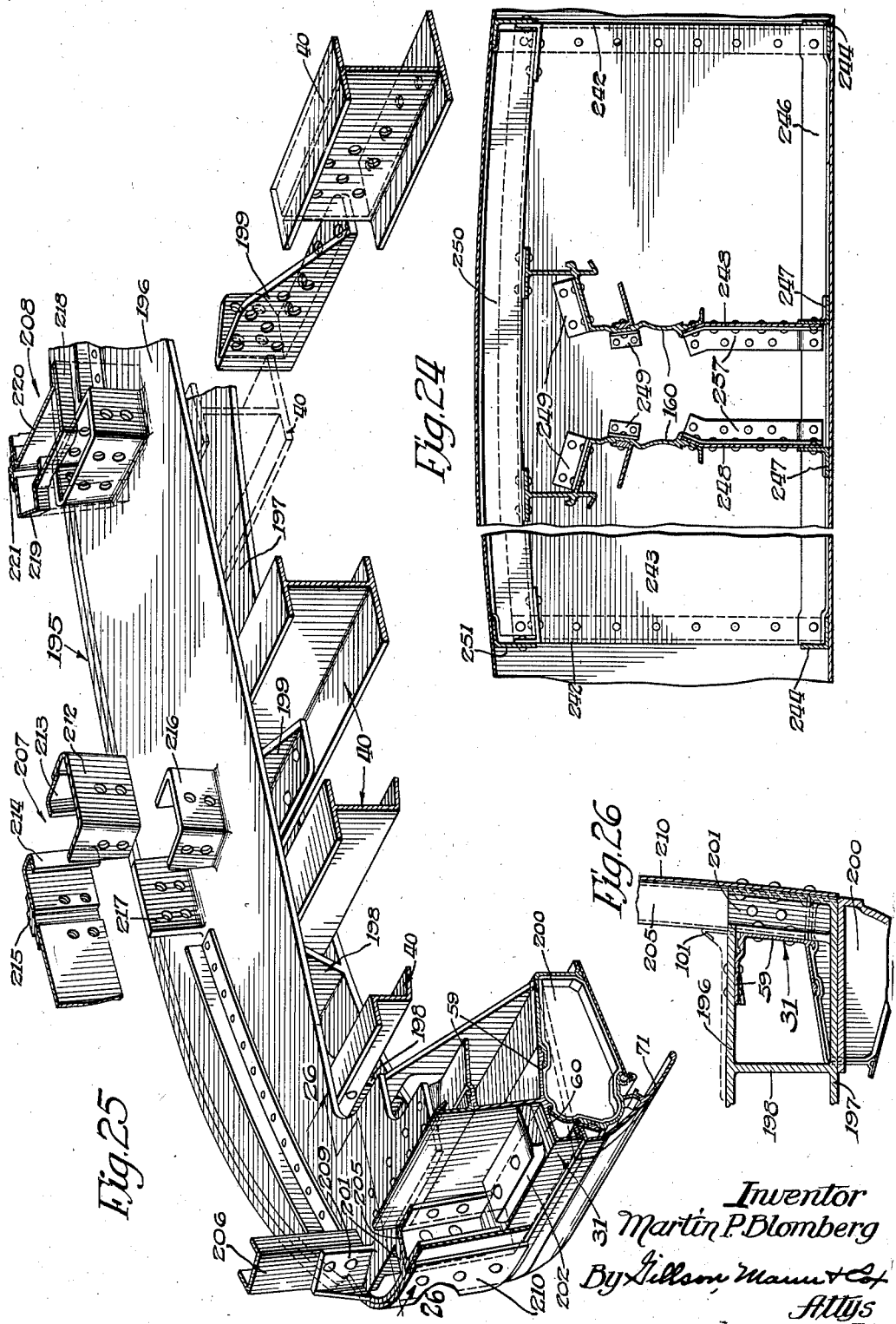

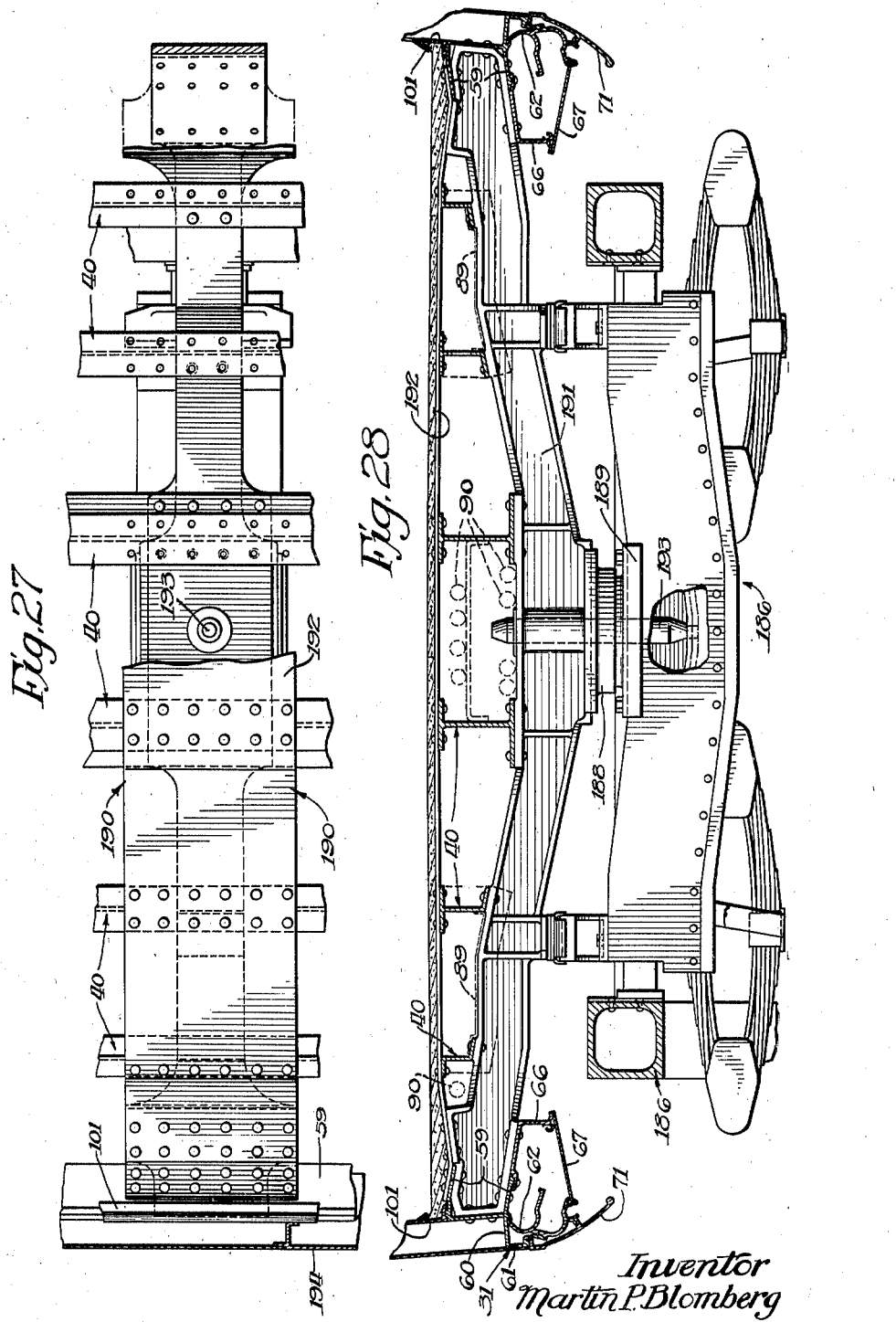

Patented June 24, 1941

2,246,499

UNITED STATES PATENT OFFICE 2,246,499

CAR CONSTRUCTION

Martin P. Blomberg, Chicago, Ill., assignor to Pullman-Standard Car Manufacturing Company, Chicago, Ill., a corporation of Delaware Application November 14, 1934, Serial No. 752,917

8 Claims. (Cl. 105—399)

Broadly, the invention relates to railway car construction with the principal object of the invention being to provide light weight equipment suitable for fast, economical rail service.

More specifically, the invention pertains to cars suitable for use on electrified subway and elevated systems, and to this end, the objects of the invention include: The provision of a multi-section, articulated car in which the weight is distributed so that the car may be used with safety on existing elevated structures; to meet the clearance requirements as determined by existing track conditions; to provide the necessary structural strength with minimum cost; to simplify the running of conduits, ducts, etc. from the one end of the car to the other; to permit additional car units to be added when desired without difficulty; to provide maximum carrying capacity for the amount of material used in the construction of the car; to provide a car which has a high factor of safety in the event of collision; and to provide a car which is capable of enduring the conditions of service.

Further and other objects and advantages will become apparent as the disclosure proceeds and the description is read in conjunction with the accompanying drawings, in which—

Fig. 1 is a side elevational view somewhat diagrammatic, of a multi-section articulated car built in accordance with this invention;

Fig. 2 is a plan layout of the first two car sections;

Fig. 3 is a front or rear elevational view of the car, the two being the same;

Fig. 4 is a typical cross sectional view through the car, the section being taken on the line 4—4 of Fig. 2;

Fig. 5 is a diagrammatic, perspective view of the framework for the C section, the parts being broken away where necessary to show more clearly the shape of the structural members.

Fig. 6 is a vertical, sectional view taken on the line 6—6 of Fig. 2;

Fig. 7 is a transverse, sectional view taken on the line 7—7 of Fig. 6;

Fig. 8 is an enlarged detail view of the indirect lighting arrangement;

Fig. 9 is a diagrammatic, perspective view showing the principal structural elements of the underframe and side frame, the view being taken substantially on the line 9—9 of Fig. 6;

Fig. 10 is a fragmentary, perspective view of the framing at the lower end of the side door post (see section line 10—10 of Fig. 2);

Fig. 11 is a perspective view of one of the main posts, the view being taken on the line 11—11 of Fig. 2, illustrating the manner in which the main post connects with the top chord, belt rail, side sill and other framing members;

Fig. 12 is a diagrammatic, perspective view of the end sill and its connections;

Fig. 13 is a detail, perspective view at one corner of the end sill;

Figs. 14 and 15 are sectional views taken on the lines 14—14 and 15—15, respectively, of Fig. 13;

Fig. 16 is a fragmentary, perspective view showing the upper portion of the end framing;

Fig. 17 is a longitudinal, vertical, sectional view of the end portion of one of the A sections, the view being taken on the line 17—17 of Fig. 2;

Fig. 18 is a detail of the upper portion of one of the end posts of an A section;

Fig. 19 is a diagrammatic, perspective view of the operating end of one of the A sections;

Fig. 20 is a fragmentary front elevational view of the upper corner of an A section;

Fig. 21 is a horizontal, sectional view taken on the line 21—21 of Fig. 20;

Figs. 22 and 23 are detail sectional views taken on the lines 22—22 and 23—23, respectively, of Fig. 21;

Fig. 24 is a vertical, sectional view taken on the line 24—24 of Fig. 17;

Fig. 25 is a perspective view of a portion of the front end sill casting showing its connections with other structural members;

Fig. 26 is a vertical, sectional view taken on the line 26—26 of Fig. 25;

Fig. 27 is a plan view of the body bolster; and

Fig. 28 is a sectional view on the line 28—28 of Fig. 17.

Inasmuch as the invention pertains to car building generally, it will be understood that the choice of a particular embodiment of the invention for illustration and description is for the purpose of disclosure only. Obviously, the invention may be embodied in other forms without departing from the spirit of the invention, and the appended claims are to be construed as broadly as the prior art will permit.

In building equipment for use on elevated structures in metropolitan areas, it is necessary to take into consideration the fact that most elevated structures have been in use for a good many years and have definite load limitations. Furthermore many of the existing elevated structures provide relatively small clearances for stations, buildings, etc. and it is, therefore, necessary in building a car for service of this kind to adapt the car to these limitations.

The public demand for faster transportation also creates the necessity of providing equipment capable of rapid acceleration and deceleration, and to this end, the cars must be made relatively light. When materials such as aluminum are used, the problem of obtaining maximum strength with the use of a minimum amount of material becomes more important due to the greater cost of aluminum.

A car which meets the requirements for this type of service has been shown in the drawings and will hereafter be described, and, in general, it consists of a plurality of body sections, adjacent ends of which are mounted on a common truck. This articulated car when composed of five sections, as shown in the drawings, preferably has three power sections each of which is equipped with controllers, resistance units and other electrical equipment for operating the car; and the other two sections carry only such electrical equipment as is necessary for carrying the control from one car section to the other and for operating the lights, heaters, etc. on the particular car section.

It is convenient to designate the front and rear sections of the car "A" sections, the adjoining sections "B" sections, and the center section, a "C" section. The A and C sections are power sections, while the B sections are in a sense merely spacers. The articulated joints between the car sections are such that the A and C sections carry the female parts and the B sections carry the male parts, so that in assembling the car, the B sections may be lowered into place to connect the A and C sections together.

GENERAL ORGANIZATION

The framing of the B and C sections is substantially identical with the exception that the B sections carry the male members, and the C section, the female members for the articulated joints between car sections. The A section differs from the B and C sections particularly in being provided with a body bolster over the end trucks and having an overhanging platform which provides an operator's cab.

For the purpose of this disclosure, it will be sufficient to describe the C section in detail and only the platform portion of the A sections.

Referring first to Fig. 5 which shows the principal structural elements of the C section, it will be seen that the body comprises, generally, end sills 30, side sills 31 joining their ends, corner posts 32, rising from the ends of the end sills, top chords 33 joining the tops of the corner posts, main posts 34 extending from the side sills to the top chords, tie bars 35 which extend from corner post to corner post and pass under the main posts; a top girder 36 which extends from one end of the car section to the other along the car center line; door end posts 37 which rise from the end sills on opposite sides of the doorways leading to the adjacent car sections; anti-telescoping plates 38 which strengthen the upper end portions of the car section; cross bearers 39 extending from side sill to side sill, and longitudinal stringers 40 which rest upon the cross bearers and are continuous from end sill to end sill.

*The underframe*

The underframe departs from conventional practice in that there is no center sill which carries the main part of the car load. Instead, the car is built as a through bridge and the longitudinal stringers 40 merely serve to support the floor and transmit the shock of collision from one car section to another.

The end sills 30 each comprise an aluminum alloy casting having a top face 41 (Fig. 12), bottom face 42, and a plurality of connecting webs including vertical webs 43 to which the stringers 40 are secured. The two inside stringers are I-beams (one of the lower flanges being somewhat lengthened) and these stringers have cut-out portions 44 to enable them to frame into the end sill with rivets 45 securing the web of the I-beam to the vertical web of the end sill, and other rivets securing the top and bottom flanges to overhanging projections 46 on the end sill. It will be noted (Fig. 12) that the upper and lower portions of the end sill web 43 are cut out as indicated at 47 to accommodate the bottom flange of the I-beams.

Adjacent to the I-beam stringers are J-beam stringers (Fig. 12). These also have cut-out portions 48 to enable the beam to be riveted to the web 43 provided for that purpose.

The outside stringers are Z-bars and they have their bottom flanges cut off at the ends to permit the beams to enter the recesses in the end sill and be riveted in place.

It will be particularly noted that all of the stringers 40 are continuous from end sill to end sill, and this is particularly important because it facilitates the running of ducts, such as 89, and conduits, such as 90, through the car section.

The outer face of the end sill has a nose projection 49 to the underside of which a female center plate 50 is secured, the plate being provided with an upstanding boss 51 which enters a recess in the end sill casting to take the shear from the fastening bolts 52. A key 53 also assists in taking the shear from the bolts.

The center plate 50 rests on a truck center plate 54 (Fig. 6) carried by the truck bolster 55 of the car truck, generally designated 56. The truck center plate and body center plate have spherical mating faces which permit the truck to have rotational movement relative to the car body.

By referring to Fig. 6, it will be seen that the B section is equipped with a male center plate 57 which rides upon the top bearing surface of the female center plate 50 carried by the C section. The manner of attaching the male center plate 57 to the B section is substantially the same as for the female center plate 50.

In order to enable the B sections to be lowered into position, the vestibule units, generally designated 58, are carried by the B sections and are adapted to fit within recesses formed in the ends of the adjacent sections. Except for the fact that the vestibule unit is of such construction that it enables the B section to be lowered into place, it is of no importance here, and further description of this unit will be omitted.

The side sills 31 (see Fig. 9) are of irregular shape and like many of the other structural elements, are preferably formed of aluminum by the extrusion process. They consist of a channel-shaped portion 59 adapted to receive the ends of the cross bearers 39, a ledge 60 upon which the side posts are mounted, and a depending portion 61 to which a cable duct stringer 62 is secured. The cross bearers 39 which are J-shaped in cross section have their top flanges 63 riveted to the top flange of the channel portion 59 (Figs.

7 and 9) and their lower flanges 64 riveted to the bottom flange of the same channel.

Beneath the side sills are cable ducts, generally designated 65, which comprise the stringer 62, a stringer 66, and a bottom closure plate 67. This duct runs the entire length of the car section and frames into the end sill, as best shown in Figs. 12-15 inclusive.

The end sill is provided with a ledge 68 which receives and is riveted to the channel portion 59 of the side sill. The bottom wall of the channel 59 is riveted to the bottom wall 42 of the end sill (see Fig. 14).

The cable duct terminates at the end sill, the stringers 62 and 66 being cut off beyond the single row of rivets which secure the stringer to the bottom wall 42 of the end sill. The duct is closed by a wall 69, see Figs. 12 and 14, to exclude moisture and other deleterious substances. In order that the wall may be fitted into the duct, the cable shelf 70 which constitutes an integral part of the stringer 62 is cut back a short distance, to accommodate the wall (see Fig. 12).

A skirt 71 is secured by machine screws 72 to the stringer 62 to obscure the cable duct from view and give the car a finished appearance. The skirt terminates at the end sill where it frames onto a flange 73 formed on a jacking block 74 that is riveted or otherwise secured to the ends of the end sill (see Figs. 12 and 15 particularly).

The cables or bus lines which run through the car sections emerge through a fitting 75, as shown in Fig. 12.

Side framing

The corner posts 32 each comprise a channel column 76, an angle 77, a flat bar 78, an irregularly shaped bar 79, and a channel 80 (Fig. 12). The main column 76 rests upon the ledge 60 of the side sill, and has its inside flanges 81 riveted through the side sill and end sill (see Figs. 12 and 14). The outer face of the column extends below the ledge 60 and is riveted to the side sill, as indicated at 82 (Fig. 14).

The angle 77 frames into the corner of the end sill and rests upon a ledge 83 which is a part of the jacking block 74. The plate 78 is flush with the outer face of the end sill by reason of an inset 84, and the plate rests upon the ledge 83. The channel 80 terminates at the top wall 41 of the end sill, as does also the bar 79.

The corner posts 32 on each side of the car are connected by a top chord which consists of a plurality of extruded metal sections including an inverted channel 85, an outer side plate 86 and an inner side plate 87, the latter two being provided with mating flanges which are riveted together, as shown in Fig. 16. The channel 85 receives the upper ends of the corner posts, as shown in Fig. 16, the inside flange being broken away, as at 88 to accommodate the bar 79. The plate 78 extends above the channel 85 and is rounded at its top to match the shape of the outer side plate 86.

Referring now to Fig. 11 which shows one of the main posts in detail, it will be seen that the main post has a J cross section with a relatively deep inside flange 96 and an outside flange 97. The post rests upon the tie bar 35 (which in turn is seated on the ledge 60 of the side sill) and is secured by rivets to the channel portion 59 of the side sill. The tie bar is secured to the ledge 60 by an angle 98, the upstanding flange of the angle being riveted to the web of the channel portion 59 of the side sill. In order that the main post may bear upon the angle 98 (which has a filleted corner), the flange 96 is cut slightly shorter than the rest of the main post, and the web is notched out as indicated at 99. In this way, the web of the main post rests squarely on the angle 98 and vertical forces are transmitted directly through the web.

The inner flange 96 of the main post is also riveted to a floor support angle 101 which is secured to the top of the side sill and extends from end sill to end sill. This angle facilitates the making of a seal along the edge of the floor, the floor being built up of transversely corrugated sheets 102 over which a suitable floor compound is poured.

The tops of the main posts frame into the top chords 33, as shown in Fig. 11 so that vertical forces may be transmitted between the side sills and the top chords.

The main posts are joined to the corner posts by a belt rail, generally designated 103, and a seat sill 104. The belt rail consists of an inverted channel 105, a stiffener 106, and a finish plate 107, the latter two continuing beyond the main post and joining to door posts 108. The finish plate 107 is grooved, as indicated at 109, to receive a tongue 110 on the channel 105, and the plate secures the outside sheathing 111 to the side of the car.

The channel 103 terminates at the main post, as shown in Fig. 11, the end of the channel being machined out to engage the flange 97 of the main post.

At the corner post, the belt rail has a similar connection, the channel 105 stopping at the flange of the channel column 76, and the stiffener 106 continuing to the irregular bar 79. The finish plate 107 extends over the outer face of the channel column 76 and terminates at the edge of the angle 77 (see Figs. 5 and 12).

The seat sill 104 is an extruded metal section having a ledge 112 to which the seats are attached, and the sill runs from the door post 108 to the corner post 32, the sill being secured to the flanges 81 of the channel column 76. Between the main post 34 and the door post 108, the portion of the seat sill above the flange 112 is cut away to give room for the door operating mechanism which is preferably installed in this location under one of the side seats (see Fig. 4).

The tie bar 35 has its ends firmly anchored to an intermediate portion of the corner post, the connection being made by an angle bracket having vertical faces which are riveted to the channel column 76 and an inclined face to which the end of the tie bar is securely fastened (Fig. 12). The inside flange of the channel column 76 is cut away where the tie bar emerges from the corner post.

In Fig. 10, some details are shown of the door post 108 and its connection to the side sill and belt rail. The door post is composed of an outside plate 114, an inside plate 115 with a space between for accommodating the sliding doors. The inner plate 115 has a channel portion 116 for stiffness and a flange 117 for attaching the stiffener 106 of the belt rail and the seat sill 104.

The channel portion 116 of the inside plate 115 stops at the side sill, as indicated by dotted lines, and the flange 117 continues to the tie bar 35, the flange being riveted to the side sill and floor support angle, as shown in Fig. 10.

The outside plate of the door post also rests upon the tie bar with the reinforcing rib 118 extending down to the top of the skirt 71.

The door threshold is built up from a channel 119, a threshold plate 120 and treads 121 with a door track 122 mounted between the treads. The threshold plate 120 rests on the channel 119 and on the floor support angle 101, the top portion of this angle being removed to bring the threshold plate to the proper height.

The top of the door post frames into the top chord as shown in Fig. 10 with the inner and outer plates 114 and 115 being secured to the inner faces of the top chord channel 85. As shown, the vertical rib 118 on the outer plate 114 and the reinforcement channel 116 on the inner plate 115 are cut away at the top chord channel to allow the plates to frame into the chord.

The doorway is divided into two parts by a center door post 123 of channel form having its flanged walls slightly concave to receive the rubber seal along the edge of the sliding doors. At the bottom, the center door post frames into the space between the side sill and the channel 119, and is secured to the latter. At the top, the post frames into the channel 85 in the manner shown in the drawings, a U-bracket 124 being provided to make the connection solid.

Between the corner posts and the main posts are a plurality of window posts, generally designated 125, which divide the space into a plurality of window sections. The window posts are J-shaped (see Fig. 9) and rest upon the ledge 60 of the side sill. The inside flange 126 is riveted to the channel portion 59 of the side sill and to the floor support angle 101, and at the top, the window posts frame into the channel 85 of the top chord, as clearly shown in Fig. 9.

At the belt rail 103, the inside flange 126 and a portion of the web 127 is cut away to facilitate the sash installation. The belt rail is continuous through the window posts, but is notched out to permit the T section of the window posts to continue unbroken to the top chord. It will be understood that the finish plate 107 of the belt rail is applied after the window post is assembled with the belt rail.

The entire web and inside flange of the window post is cut away where the tie bar 35 intersects with the window post and a connection is made by means of angles 128 which substantially restores the strength of the window post as a whole.

The seat sill 104 is fastened to the inside flange 126 of the window posts, as shown in Fig. 9.

It will be observed that the car floor is in the form of a truss with the cross bearers constituting the tension members, the corrugated sheets 102 and the composition flooring constituting the compression members, and the longitudinal sills constituting the struts or posts between the tension and compression members.

End framing

The end sills 30 are provided with upstanding lugs 136 and 137 (Fig. 12) to receive the door end posts, generally designated 37. Each door end post consists of a V-bar 138, an irregularly shaped bar 139, an outside duct closure plate 140, and an inside closure plate 141. The lug 136 on the end sill casting is shaped to conform with the door end post and the two are securely riveted together with the end post, and preferably having bearing contact with the top face 41 of the end sill. The V-bar 138 has a flange 142 which, with the flange 143 on the bar 139 receives the inside duct closure plate 141 to form a vertical duct 144 which is used as a part of the heating and ventilating system, the details of which are unimportant here. In a similar way, the outside duct closure plate 140 completes another vertical duct 145 which communicates with the former through openings 146.

The flange 147 of the bar 139 overlaps the lug 137 and rivets secure the two together along with the outside finish sheet 148.

All components of the door end posts are cut off at the anti-telescoping plate 38 (see Fig. 16) with the exception of the irregularly shaped bar 139 which continues upwardly to the roof (the small flange 149, however, being cut off at the anti-telescoping plate.) Angles 150 serve to fasten the anti-telescoping plate to the door end posts.

The anti-telescoping plate is a relatively deep plate which extends from top chord to top chord and has an arcuate cut-out portion 151 on its outer face. The plate is supported at the top chords by angles 152 which are rigidly secured to the inverted channels 85 of the top chords.

The anti-telescoping plate 38 is stiffened along its outer margin by an angle 153 and along its inner margin by an angle 154, and intermediate these angles, other angles 155 serve not only to stiffen the plate, but also to secure a concave wall 156 to the plate. The wall 156 is reinforced along its upper edge by an angle 157 which continues along the upper edge of the outside finish sheet 148 down to the top chord. The angle 157 also serves to fasten the side plate 86 of the top chord to the end finish sheet 148 and to the upstanding plate 78 of the corner post.

Along the forward edge of the anti-telescoping plate 38 is a bulkhead 158 which is secured to the plate by the angle 154. The bulkhead is provided with openings 159 to afford access to the equipment which is mounted on the anti-telescoping plate, and normally these openings are closed by cover plates (not shown). The top of the bulkhead is rounded to conform with the shape of the roof, as shown in Fig. 5.

Roof structure

The top sill 36 which runs the length of the car, serves not only as a structural element in supporting the roof load and transmitting longitudinal stresses, but also as an air duct and lighting trough. The sill comprises lighting trough plates 160 and top and bottom closure plates 161 and 162, respectively. The duct area 163 formed by the box girder top sill is used for drawing air from the car either to be exhausted from the car or reused after having passed through the air conditioning apparatus. The lighting trough plates 160 are provided with openings 164 to admit air to the duct.

The indirect lighting carried by the top sill is best shown in Figs. 7 and 8 and, briefly, it consists of a plurality of lamp sockets 165 supported by angles 166 with bulbs 167 extending into a reflector trough 168 supported by the top sill. Light rays emanating from the trough are directed against the ceiling sheets 169 and then reflected and dispersed throughout the car interior.

The plates 160 of the top sill extend through an opening 170 in the bulkhead 158 at each end of the car and are fastened to brackets 171 which are securely riveted to the semi-circular walls 156 at the ends of the car. Small angle brackets 172 aid in making the connection.

The top and bottom closure plates 161 and 162 stop at the bulkhead as it is unnecessary to continue these plates to the end of the car for structural purposes, and, furthermore, because the duct 163 is in communication with the space behind the bulkhead through openings 173 in the trough plates 160.

The relationship between the horizontal duct 163 and the vertical ducts 144 and 145 in the door ends posts is a matter which pertains to the ventilating system of the car and this subject matter is claimed in another application of Martin P. Blomberg, Serial No. 757,867, filed December 17, 1934, for Heating and ventilating system for vehicles.

A plurality of carlines 174 connect the top chords 33 and carry the roofing sheet 175. The carlines are channel-shaped in cross section and have flanged feet 176, see Fig. 6, to facilitate the application of the roof sheet. At the main posts, two carlines are placed close together to assist in transmitting stresses between the roof and the car underframe.

The carlines frame into the open trough 177 along the upper margin of the top chords, the connection being best shown in Figs. 7 and 9. The top sill 36 is also connected to the carlines, as shown in Fig. 7.

The car construction which has been described above is particularly suitable for aluminum fabrication because it takes into consideration the fact that aluminum has approximately three times the deflection of steel. Of course, there is a corresponding structural advantage even when the car is built of steel, or other material.

It will be observed that the car of this invention is framed so that its component parts often serve more than one function in the car framework; that electric cables, air hose, ducts, etc. can be conveniently run from one car end to the other without interference from transverse framing members; that the structure is composed of a plurality of sub-assemblies which more readily adapts the car construction to mass production methods; that the side frame is formed as a truss so as to minimize deflection; that all the principal stress members are formed as box columns, or box girders in order to get maximum strength for the amount of material used; that the hollow columns and girders are used for air ducts, conduit passages, etc., thus obviating the necessity of providing special passages for this purpose; that the floor of the car is in the form of a truss with the corrugated floor sheets and composition flooring serving as compression members in the truss; that the longitudinal sills run the entire length of the car body and serve not only to transmit buff and draft forces, but also to facilitate the running of air hose, control pipes, electrical conduits, air ducts, etc. longitudinally of the car body; that the heavier longitudinal sills along the center line of the car carry the greater part of the stress transmitted through the sills and consequently reduce the bending moment on the end sills; that the belt rail is a continuous piece from the door post to the corner post and all the above advantages are gained with the use of a minimum amount of material, without complicating the assemblage of the parts, and without sacrificing accessibility and convenience for repair.

Structure of the A sections

As stated before, the A sections differ from the other sections primarily in the fact that they have a platform in addition which overhangs the swivel trucks which support the front and rear end of the articulated car. Because of this similarity in structure, only the platform will be described, it being understood that the rest of the car follows the framing which has already been discussed.

Referring now to Figs. 17-28 inclusive, it will be seen that the forward end of the leading A section (or the rear end of the trailer A section) is supported by a truck 186 on a center bearing 187 which includes a body center plate 188 and a truck center plate 189. The body center plate 188 is mounted on the underside of a body bolster, generally designated 190, which differs from conventional body bolsters in that it permits the longitudinal stringers 40 to pass through the bolster between the compression member 191 and the tension member 192 without being broken at the bolster. As shown best in Figs. 27 and 28, the compression element of the bolster consists of a casting which is shaped more or less the same as the cross-bearers 39 with the exception that it is somewhat heavier and has an opening at its center to receive the king pin 193 of the center bearing. The tension member of the bolster is a plate which connects the two ends of the depressed compression member.

It will be understood that the stringers 40 are securely riveted to the bolster passing between the compression and tension members.

Inasmuch as the A-sections have an overhanging platform, it is necessary to provide a heavy side post 194 which corresponds structurally to the corner posts of the B and C sections, and particularly to the channel section 76.

The front end sill 195 on the platform is a casting having a slightly rounded nose and provided with a top face 196, a bottom face 197, and a plurality of webs 198 to which the stringers 40 are attached. Their method of attachment is similar to that previously described for the end sill of the C section, and no further description is believed necessary except to point out that in the embodiment shown, the center I-beams are secured to the front end sill by cast brackets 199 which are riveted to the front and bottom faces of the end sill.

The side sill 31 frames into the end of the front end sill 195 in a manner best shown in Figs. 25 and 26, the portion of the side sill below the channel portion 59 being cut away where the latter portion enters the recess between the top and bottom walls of the casting (see Fig. 26). The cable duct is closed by a plate 200 as before.

The lower portion of the side sill abuts a wall 201 of the end sill casting, and a short tie bar 202 extends from the side sill to the belt rail just in front of the side post 194. Angle brackets 203 and 204 are used in making the connections.

Rising from the front end sill 195 are corner posts 205 and 206, a split door end post 207, and a box column door end post 208. The corner post 205 has its web riveted to the wall 201 of the end sill casting and its side flange riveted to the side sill. The other corner post 206 has its web riveted to a lug 209 which is integral with the end sill casting, and a curved plate 210 fits over the corner of the end sill casting and connects the two corner posts together to form a rigid column (see Figs. 19 and 25).

The split door end post 207 permits the front door 211 of the car to slide to one side, the inside portion of the post consisting of a channel 212 and an angle 213, and the outside portion consisting of a J-bar 214, and a stiffener 215. Lugs 216 and 217 provide fastening surface for securing the two parts of the split post to the end sill casting.

The box column door end post 208 is made up of a plurality of sections, as shown in Figs. 18 and 19, these sections including an angle 218, an irregular section 219, channel 220, and a stiffener 221, the latter matching the stiffener 215 of the split door end post.

The tops of the door end posts 207 and 208 are connected to the anti-telescoping plate 222 by brackets 223, and an angle 224 and a Z-bar 225 extending between the two posts furnish a track for the door 211. Surmounting the anti-telescoping plate at its margin is a boundary angle 226 to which a hood casting 227 is secured, the latter having a flange 228 which rests upon the boundary angle 226 and another flange 229 which overlaps a finish plate 230 (Fig. 18).

The hood casting 227 is shown generally in Figs. 3 and 17 and is used to house the route designation signs, and part of the equipment which operates the signs.

Corner posts 205 and 206 frame into corner castings, generally designated 231 (Figs. 19-23 inclusive) each of which has a horizontal web 232 which seats upon the boundary angle 226 of the anti-telescoping plate 222. The casting is provided with a downwardly extending lug 233 which provides riveting surface for connecting the corner posts 205 and 206 to the corner castings. A marginal lip 234 on the corner casting overlaps the curved plate 210, the finish plate 230 at the front of the car, and the inverted channel 85 of the top chord.

The casting 231 is provided with a stepped wall 235, the first step 236 of which receives the outer side plate 86 and a second step 237 receiving the inner side plate 87 (see Figs. 22 and 23). The casting also has an inclined wall 238 which seats on the inverted channel 85 of the top chord, the latter being extended beyond the side plates 86 and 87 to permit the channel to be anchored to the corner casting. A vertical web 239 merges with the inclined web 238 and strengthens the casting at the corner. The vertical web also stiffens the anti-telescoping plate by reason of the fact that the horizontal web 232 projects a substantial distance over the anti-telescoping plate and is secured to it. The anti-telescoping plate 222 is joined to the top chords by angles 255 that are riveted to the inverted channel 85 of the top chords in the same manner as in the C section.

The route designation signs within the hood casting occupy a box, generally designated 240, formed by side walls 241 and 242, and a rear wall 243. The side walls are fastened to angles 244 which extend rearwardly from the boundary angle 226 to a cross angle 245 which marks the rear edge of the anti-telescoping plate. A transverse angle 246 connects the angles 244 on opposite sides of the box 240 and two other angles 247 extend rearwardly from this angle to the cross angle 245. A pair of shear plates 248 are secured to the angles 247 and connect the anti-telescoping plate to the side members 160 of the top sill 36. The ends of the shear plates are fastened to the rear wall 243 of the route designation bar by angles 257. Small angle brackets 249 connect the upper portions of the top sill to the rear wall 243 of the sign box 240 and the tops of the duct sides are secured to a short carline 250 extending between angles 251 which bind the top of the box sides 241 and 242 and connect them to a full carline 252.

The bulkhead 253 in the A section is placed so as to provide considerable space behind the sign box 240 for various equipment, such as electric motors, control apparatus, sign operating mechanism, etc. A removable plate 254 affords ready access to the space behind the bulkhead.

Beneath the platform is a broad bar, generally designated 256 for coupling the car with other units. The draw bar is of conventional construction and need not be specifically described.

The invention may be variously embodied within the scope of the appended claims.

I claim:

1. In a railway car, an underframe including side sills, side frames including main posts, corner posts and top chords connecting the upper portions of the posts, the side sills and top chords being a part of the main stress framework of the car, and the former each having an inwardly extending flange adapted to form at least a part of the cable duct running longitudinally of the car adjacent to the side sills.

2. In a railway car, an underframe including side sills, side frames comprising a plurality of side posts having their upper portions connected by top chords, carlines joining the side frames overhead, said top chords comprising curved box girders having top and bottom channels for receiving the roof carlines and side posts, respectively.

3. A railway car having body framework including an underframe, side frames rising from opposite sides of the underframe and including a relatively deep top chord, carlines joining the side frames, said chords comprising box girders having channels on their upper sides for receiving the lower ends of said carlines, said side frames including a tie bar for transferring a substantial part of the car load to the upper part of said framework.

4. In a railway car, car framework including a top sill running longitudinally of the car along the car center line, side frames including top chords at their upper margins, an underframe, and end posts connecting the underframe with the top sill, said top sill, top chords and end posts being formed as box columns and box girders whereby deflection of the car as a whole is reduced to a minimum.

5. In a railway car, an underframe comprising end sills, side sills connecting the ends of the end sills, a plurality of longitudinal sills running the full length of the car and framing into the end sills, cross bearers connecting the side sills and supporting the longitudinal sills intermediate their ends, and corrugated metal floor sheets resting on the longitudinal sills and constituting the compression member of a floor truss extending transversely of the car which includes the cross bearers and longitudinal sills.

6. In a railway car, car framework comprising hollow column corner posts at each end of the car, end sills connecting the lower ends of said posts at each end of the car, anti-telescoping plates connecting the tops of the posts at the car ends, channeled side sills connecting the lower ends of the end posts at each side of the car, and channeled top chords connecting the tops of said end posts at the sides of the car.

7. In a railway car, a hollow metal corner post at each corner of said car, a trussed floor construction connecting the lower ends of said posts, means for connecting the tops of said posts together at the ends of the car, a box girder along the center line of the roof of the car connected at its ends to said means, and hollow chords at the sides of the car for connecting the top ends of said posts together.

8. In a railway car construction, an end sill at each end thereof, a plurality of side and intermediate sills extending from end to end of said car and having their ends framed into said sills, cross bearers extending between and abutting said side sills and extending beneath said intermediate sills, and a floor supported by said sills whereby the space between said sills is unobstructed from end sill to end sill of said car.

MARTIN P. BLOMBERG.